(12) United States Patent
Evans

(10) Patent No.: US 9,426,299 B2
(45) Date of Patent: Aug. 23, 2016

(54) PROCESSING COMMUNICATION SESSIONS

(71) Applicant: Metaswitch Networks Ltd., Enfield (GB)

(72) Inventor: Michael Jeffrey Evans, Enfield (GB)

(73) Assignee: Metaswitch Networks Ltd., Enfield (GB)

( * ) Notice: Subject to any disclaimer, the term of this patent is extended or adjusted under 35 U.S.C. 154(b) by 118 days.

(21) Appl. No.: 14/012,938

(22) Filed: Aug. 28, 2013

(65) Prior Publication Data

US 2014/0064155 A1  Mar. 6, 2014

(30) Foreign Application Priority Data

Aug. 31, 2012 (GB) .................................. 1215536.2

(51) Int. Cl.
| | |
|---|---|
| *H04L 12/16* | (2006.01) |
| *H04M 3/54* | (2006.01) |
| *H04L 29/06* | (2006.01) |
| *H04M 3/42* | (2006.01) |
| *H04M 3/58* | (2006.01) |

(52) U.S. Cl.
CPC ............. *H04M 3/54* (2013.01); *H04L 65/1006* (2013.01); *H04L 65/1073* (2013.01); *H04L 65/1086* (2013.01); *H04L 65/1096* (2013.01); *H04M 3/42263* (2013.01); *H04M 3/58* (2013.01); *H04M 2201/42* (2013.01)

(58) Field of Classification Search
CPC ....................................................... H04M 7/006
USPC ......................................................... 370/259
See application file for complete search history.

(56) References Cited

U.S. PATENT DOCUMENTS

2006/0126648 A1*  6/2006  Park et al. ...................... 370/401
2006/0294244 A1* 12/2006  Naqvi et al. .................. 709/227
(Continued)

FOREIGN PATENT DOCUMENTS

| EP | 2 093 968 A1 | 8/2009 |
| EP | 2 247 087 A1 | 11/2010 |

(Continued)

OTHER PUBLICATIONS

Guenkova-Luy, Teodora et ai., "Service Mobility with SIP, SDP and MPEG-21", 9th International Conference on Telecommunications—ConTEL 2007, Jun. 13-15, 2007, pp. 293-300.

(Continued)

*Primary Examiner* — Samina Choudhry
(74) *Attorney, Agent, or Firm* — EIP US LLP

(57) ABSTRACT

Measures for moving an established communication session in a telecommunications network, the communication session being established between a first device in a plurality of user devices associated with a user and a remote user device associated with a remote party, to a second device in the plurality of user devices associated with the user. At the second user device, a message is received from the first user device indicating that a communication session has been established between the first user device and the remote user device, the message comprising contact information for the remote user device. The second user device transmits, to the remote user device using the contact information comprised in the message, a request to replace the communication session established between the first user device and the remote user device with a communication session between the second user device and the remote user device.

15 Claims, 9 Drawing Sheets

(56) References Cited

U.S. PATENT DOCUMENTS

| | | |
|---|---|---|
| 2009/0210536 A1 | 8/2009 | Allen et al. |
| 2011/0040836 A1* | 2/2011 | Allen et al. ............. 709/205 |
| 2011/0122864 A1 | 5/2011 | Cherifi et al. |
| 2012/0148037 A1 | 6/2012 | Brunson |
| 2012/0214458 A1 | 8/2012 | Levien et al. |

FOREIGN PATENT DOCUMENTS

| | | | |
|---|---|---|---|
| GB | 2479180 | A | 10/2011 |
| GB | 2505476 | A | 3/2014 |
| WO | 2011008051 | A2 | 1/2011 |
| WO | 2011009490 | A1 | 1/2011 |
| WO | 2011146679 | A1 | 11/2011 |
| WO | 2012074643 | A1 | 6/2012 |
| WO | 2012074737 | A1 | 6/2012 |
| WO | 2013067169 | A1 | 5/2013 |

OTHER PUBLICATIONS

First GB Search Report issued Jan. 17, 2013 in related application GB1215536.2 filed Aug. 31, 2012.

Second GB Search Report issued Jun. 19, 2013 in related application GB1215536.2 filed Aug. 31, 2012.

European Search Report issued Dec. 18, 2013 in related application EP 13182273.6 filed Aug. 29, 2013.

* cited by examiner

PROCESSING COMMUNICATION SESSIONS

CROSS REFERENCE TO RELATED APPLICATION

This application claims benefit under 35 U.S.C. §119(a) and 37 CFR 1.55 to UK patent application no. GB 1215536.2, filed on 31 Aug. 2012, the entire content of which is hereby incorporated by reference.

TECHNICAL FIELD

The present disclosure relates to processing communication sessions. In particular, but not exclusively, the present disclosure relates to measures for moving a communication session established between a first device in a plurality of user devices associated with a user and a remote user device associated with a remote party in a telecommunications network to a second device in the plurality of user devices.

BACKGROUND

Telephony users have long had to deal with a proliferation of user devices (sometimes referred to as 'user equipment' or 'endpoints') through which third parties may contact them. For example, a user might have a fixed-line (or 'wireline') user device for use at home, a further fixed-line telephony user device for use in the office, and a mobile user device for use whilst on the move. Each type of user device has associated advantages; whilst a mobile user device provides the user with mobility, a fixed-line user device typically provides more reliable and higher quality communications and no battery recharge concerns.

Users may also have a number of different access technologies available through which their user devices may conduct communications. For example, a user device may be equipped with a circuit-switched communication interface and one or more circuit-switched communication clients for conducting communications via suitable circuit-switched networks. Likewise, a user device may also/alternatively be equipped with a packet-switched communication interface and one or more packet-switched communication clients for communicating via suitable packet-switched networks.

A circuit-switched user device may comprise a fixed-line Plain Old Telephone Service (POTS) telephone equipped with a circuit-switched interface and communication client for conducting communications via a Public Switched Telephone Network (PSTN). A circuit-switched user device may comprise a mobile (or 'cellular') telephone equipped with a wireless circuit-switched interface and communication client for conducting communications via a cellular network such as a Global System for Mobile Communications (GSM) network or Code Division Multiple Access (CDMA) network.

More recently, packet-switched user devices have proliferated which may take the form of a fixed-line Internet Protocol (IP) telephone equipped with a fixed-line packet-switched interface and communication client for communicating via an IP network, such as the internet or an IP Private Branch Exchange (IP-PBX). Similarly, a user may conduct communications via a personal computer (PC) equipped with a packet-switched communication client for conducting communications over the internet via a fixed-line internet connection. A mobile packet-switched telephony device may take the form of a portable computing device, such as a laptop or tablet, equipped with a wireless packet-switched interface and communication client for communicating via an IP network, such as the internet, using a Wi-Fi™ or Bluetooth™ compliant wireless access point. A packet-switched communication client may conduct communications according to an internet telephony protocol, commonly referred to as Voice over Internet Protocol (VoIP), with associated setup and control protocols such as the Session Initiation Protocol (SIP) or H.323.

When a user is conducting a call on a user device, the user may wish to 'jump' or 'switch' the call to another user device. Call jump is generally accepted to be a distinct service to call transfer. Call transfer is used to transfer a call to a different user, whereas call jump moves the call to another device owned by the same user, so the two services involve a different user experience. For example, during a call transfer the remote call party is either placed on hold or hears a ring-back tone while the transfer recipient's phone rings. In contrast, a call jump service attempts to minimize the disruption to the call as perceived by the remote party, so the remote party is not placed on hold and does not hear any call progress tones.

Some known call jump systems employ a call 'push' technique where a user initiates the call jump from within a call they are currently conducting on one of their user devices. Some such known techniques require a user firstly to enter in a number of digits on their device for activating the call jump, for example entering digits of a 'star code', and optionally entering in digits identifying the device the call is to be pushed to. Other known call jump systems employ a call 'pull' technique where a user invokes the call jump from a user device other than the user device currently being used to conduct the call, and similarly may require a user to enter in a number of digits on the other device for activating the call jump and entering in digits identifying the device the call is to be pulled from.

Known call jump implementations work by inserting a server such as an application server, in the signalling path of a communication session, using an in-band (for example Dual-Tone Multi-Frequency (DTMF) or Session Initiation Protocol (SIP) INFO messages) or out-of-band (such as Hypertext Transfer Protocol (HTTP)) signalling channel between clients and this server to control the service. In such implementations, logic to drive the appropriate signalling flows for communication session jump operations such as call push or call pull is implemented in the server. An implementation using in-band signalling can only support call push, but those using out-of-band signalling can support both push and pull operations.

Such server-based call jump implementations can suffer from significant cost and reliability downsides.

It would therefore be desirable to provide improved call jump services.

SUMMARY

In accordance with a first aspect of the present disclosure, there is a method of moving an established communication session in a telecommunications network, the communication session being established between a first device in a plurality of user devices associated with a user and a remote user device associated with a remote party, to a second user device in the plurality of user devices associated with the user, the method comprising, at the second user device:

receiving, from the first user device, a message indicating that a communication session has been established between the first user device and the remote user device, the message comprising contact information for the remote user device; and transmitting, to the remote user device using the contact information comprised in the message, a request to replace the communication session established between the first user device and the remote user device with a communication session between the second user device and the remote user device.

In accordance with a second aspect of the present disclosure, there is apparatus for use in moving an established communication session in a telecommunications network, the communication session being established between a first device in a plurality of user devices associated with a user and a remote user device associated with a remote party, to a second user device in the plurality of user devices associated with the user, the apparatus comprising at least one processor, and at least one memory including computer program code, the at least one memory and the computer program code being configured to, with the at least one processor, cause the apparatus at least to, at the second user device:

receive, from the first user device, a message indicating that a communication session has been established between the first user device and the remote user device, the message comprising contact information for the remote user device; and transmit, to the remote user device using the contact information comprised in the message, a request to replace the communication session established between the first user device and the remote user device with a communication session between the second user device and the remote user device.

In accordance with a third aspect of the present disclosure, there is a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second user device in the plurality of user devices associated with the user, the method comprising, at the second user device:

receiving, from the first user device, a message indicating that a communication session has been established between the first user device and the remote user device, the message comprising contact information for the remote user device; and transmitting, to the remote user device using the contact information comprised in the message, a request to replace the communication session established between the first user device and the remote user device with a communication session between the second user device and the remote user device.

In accordance with a fourth aspect of the present disclosure, there is a method of moving an established communication session in a telecommunications network, the communication session being established between a first device in a plurality of communication devices associated with a user and a remote communication device associated with a remote party, to a second user device in the plurality of user devices associated with the user, the method comprising, at the first user device:

receiving, from the second user device, a request to be notified of any communication session established by the first user device; and transmitting, to the second user device, a message indicating that a communication session has been established between the first user device and the remote user device, the message comprising contact information for the remote user device.

In accordance with a fifth aspect of the present disclosure, there is apparatus for use in moving an established communication session in a telecommunications network, the communication session being established between a first device in a plurality of communication devices associated with a user and a remote communication device associated with a remote party, to a second user device in the plurality of user devices associated with the user, the apparatus comprising at least one processor, and at least one memory including computer program code, the at least one memory and the computer program code being configured to, with the at least one processor, cause the apparatus at least to, at the first user device:

receive, from the second user device, a request to be notified of any communication session established by the first user device; and transmit, to the second user device, a message indicating that a communication session has been established between the first user device and the remote user device, the message comprising contact information for the remote user device.

In accordance with a sixth aspect of the present disclosure, there is a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of communication devices associated with a user and a remote communication device associated with a remote party, to a second user device in the plurality of user devices associated with the user, the method comprising, at the first user device:

receiving, from the second user device, a request to be notified of any communication session established by the first user device; and transmitting, to the second user device, a message indicating that a communication session has been established between the first user device and the remote user device, the message comprising contact information for the remote user device.

In accordance with first embodiments, there is a method of moving an established communication session in a telecommunications network, the communication session being established between a first device in a plurality of user devices associated with a user and a remote user device associated with a remote party, to a second user device in the plurality of user devices associated with the user, the method comprising, at the first user device:

receiving a message indicating that the second user device is registered with the network, the message comprising contact information for the second user device; and transmitting, to the second user device using the contact information comprised in the message, a request to establish a communication session between the second user device and the remote party device in place of the communication session established between the first user device and the remote party device, the request comprising contact information for the remote user device.

In accordance with second embodiments, there is apparatus for use in moving an established communication session in a telecommunications network, the communication session being established between a first device in a plurality of user devices associated with a user and a remote user device associated with a remote party, to a second user device in the plurality of user devices associated with the user, the apparatus comprising at least one processor, and at least one memory including computer program code, the at least one memory and the computer program code being configured to, with the at least one processor, cause the apparatus at least to, at the first user device:

receive a message indicating that the second user device is registered with the network, the message comprising contact information for the second user device; and transmit, to the second user device using the contact information comprised in the message, a request to establish a communication session between the second user device and the remote party device in place of the communication session established between the first user device and the remote party device, the request comprising contact information for the remote user device.

In accordance with third embodiments, there is a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second user device in the plurality of user devices associated with the user, the method comprising, at the first user device:

receiving a message indicating that the second user device is registered with the network, the message comprising contact information for the second user device; and transmitting, to the second user device using the contact information comprised in the message, a request to establish a communication session between the second user device and the remote party device in place of the communication session established between the first user device and the remote party device, the request comprising contact information for the remote user device.

In accordance with fourth embodiments, there is a method of moving an established communication session in a telecommunications network, the communication session being established between a first device in a plurality of user devices associated with a user and a remote user device associated with a remote party, to a second user device in the plurality of user devices associated with the user, the method comprising, at the second user device:

receiving, from the first user device, a request to establish a communication session between the second user device and the remote user device in place of the communication session established between the first user device and the remote user device, the request comprising contact information for the remote user device; and transmitting to the remote user device using the contact information comprised in the communication session establishment notification, a request to replace the communication session established between the first user device and the remote user device with a communication session established between the second user device and the remote user device.

In accordance with fifth embodiments, there is apparatus for use in moving an established communication session in a telecommunications network, the communication session being established between a first device in a plurality of user devices associated with a user and a remote user device associated with a remote party, to a second user device in the plurality of user devices associated with the user, the apparatus comprising at least one processor, and at least one memory including computer program code, the at least one memory and the computer program code being configured to, with the at least one processor, cause the apparatus at least to, at the second user device:

receive, from the first user device, a request to establish a communication session between the second user device and the remote user device in place of the communication session established between the first user device and the remote user device, the request comprising contact information for the remote user device; and transmit to the remote user device using the contact information comprised in the communication session establishment notification, a request to replace the communication session established between the first user device and the remote user device with a communication session established between the second user device and the remote user device.

In accordance with sixth embodiments, there is a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second user device in the plurality of user devices associated with the user, the method comprising, at the second user device:

receiving, from the first user device, a request to establish a communication session between the second user device and the remote user device in place of the communication session established between the first user device and the remote user device, the request comprising contact information for the remote user device; and transmitting to the remote user device using the contact information comprised in the communication session establishment notification, a request to replace the communication session established between the first user device and the remote user device with a communication session established between the second user device and the remote user device.

Further features of embodiments will become apparent from the following description of preferred embodiments, given by way of example only, which is made with reference to the accompanying drawings.

DETAILED DESCRIPTION

Figure 1:
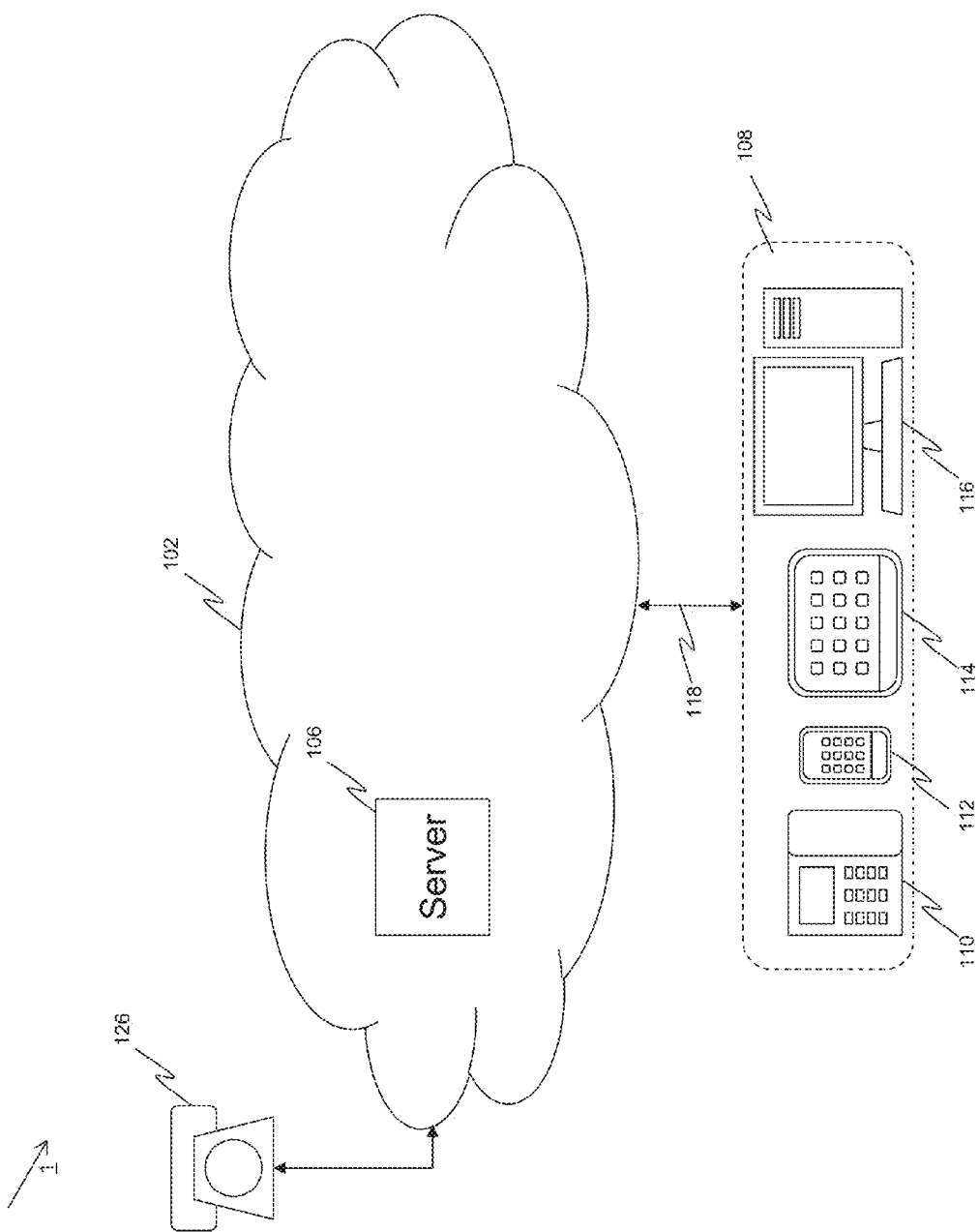
FIG. 1 shows a system diagram according to the prior art.

FIG. 1 shows a system diagram of a system 1 according to the prior art. System 1 includes a telecommunications network 102 which may for example include one or more PSTN parts, one or more mobile (or 'cellular') telephone network parts and/or one or more packet-switched network parts such as the Internet (not shown). Telecommunications network 102 may include one or more gateway or session border controller entities (not shown) which carry out conversion between the various protocols and data formats used to transfer media data and signalling data in different network parts making up telecommunications network 102. For example, a media gateway (not shown) may convert between the different protocols of media data passing between a circuit-switched network part and a packet-switched network part of telecommunications network 102, such as packetised VoIP data into Time-Division-Multiplexing (TDM) voice data and vice versa. A signalling gateway (not shown) may convert between the different protocols of signalling information passing between a circuit-switched network part and a packet-switched network part of telecommunications network 102, such as SIP, Signalling System 7 (SS7), Integrated Services Digital Network User Part (ISUP), American National Standards Institute (ANSI)-41, Mobile Application Part (MAP) formats, etc.

Telecommunications network 102 includes a server 106 which hosts and controls call jump services. Server 106 which may also be referred to as a media gateway controller, service platform, call agent, application server or softswitch and may also perform other functions typically associated with such entities. Although depicted in FIG. 1 as a single network entity, application server 106 may comprise a plurality of network entities, with elements located within telecommunications network 102 or one or more other networks (not shown).

A user of the prior art call jump service has a plurality of user devices 108 through which they may conduct communication sessions via the service. The various devices 108 through which a user can conduct communications are considered to be associated with that user. The user's associated devices may include, for example, desk phone 110, mobile (or 'cellular') telephone 112, tablet 114 and/or personal computer 116. Each of the user's telephony devices is equipped with one or more interfaces and one or more communication clients for conducting communications in telecommunications network 102 via link(s) 118. Link 118 could comprise a wired link to telecommunications network 102 in the case of a fixed line device such as personal computer 116 or deskphone 110, and/or a wireless link (e.g. Wi-Fi, Bluetooth, 3G-LTE, WiMax, etc.) to telecommunications network 102 in the case of mobile telephone 112 or tablet 114.

In order to provide call jump services in telecommunications network 102, signalling information for communication sessions conducted between one of the user's devices 108 and a user device of a remote party 126 is routed through telecommunications network 102 via application server 106. Application server 106 is therefore located in the signalling path for communication sessions conducted to/from a user's devices 108 and remains in the signalling path for the duration of such communication sessions.

Application server 106 may also be located in the media path for communication sessions conducted to/from a user's devices 108.

In order to host call jump services in telecommunications network 102, application server 106 needs to provide control functionality associated with enabling call jump services, including capabilities for processing signalling information and state information associated with such. Application server 106 also needs to have high availability in order to make provision of such services viable. Such prior art server-based call jump implementations can therefore suffer from significant cost and reliability downsides.

Figure 2:
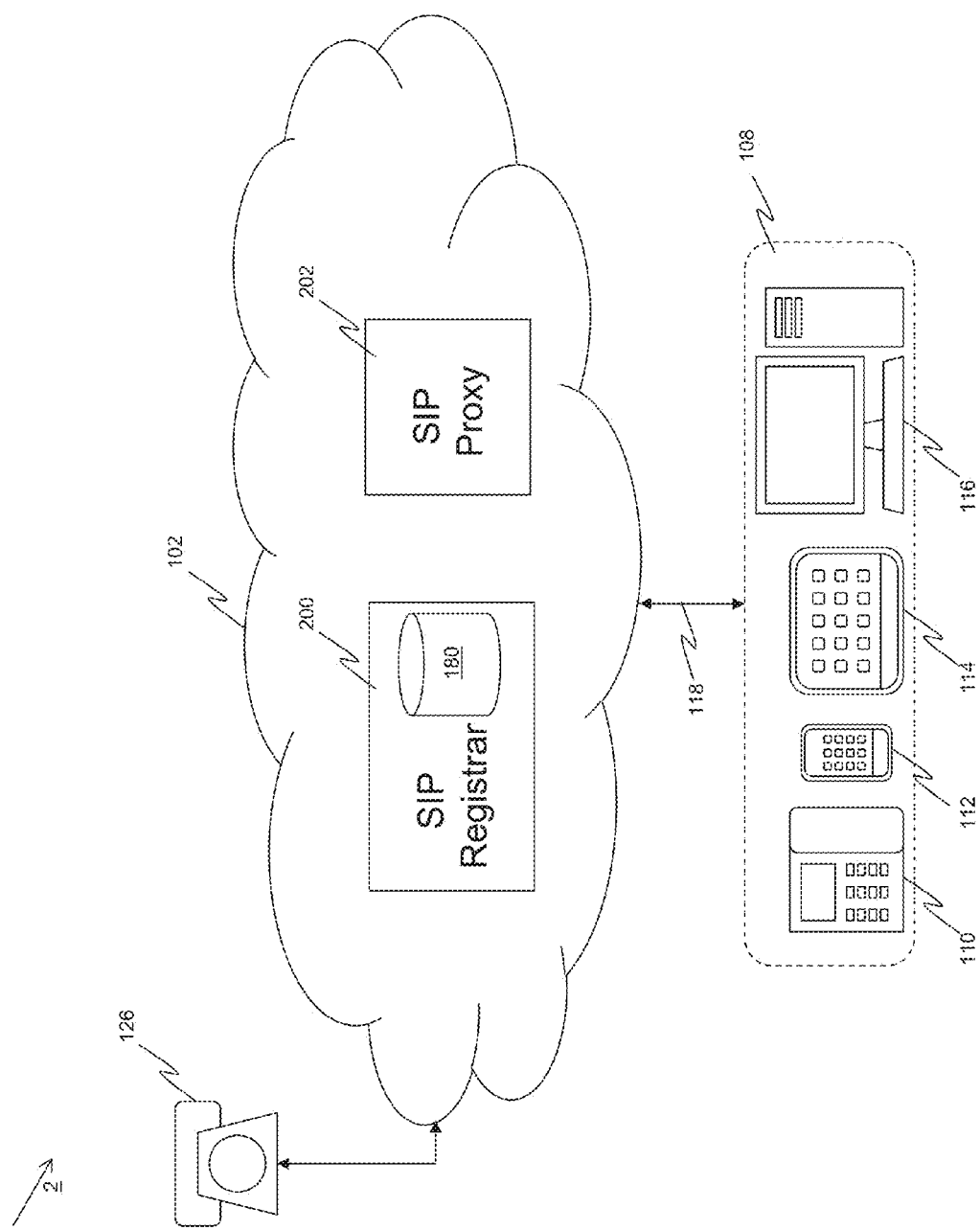
FIG. 2 shows a system diagram according to embodiments.

FIG. 2 shows a system diagram according to embodiments. Similarly to FIG. 1, FIG. 2 depicts a system 2 which includes a telecommunications network 102, a remote user device 126 and a plurality 108 of user devices 110, 112, 114, 116 associated with a user connected to telecommunications network 102 via link(s) 118. One or more of user devices 110, 112, 114, 116 may be SIP compliant SIP user agents.

Telecommunications network 102 includes a SIP registrar network entity 200. SIP registrar network entity 200 is a server that processes SIP REGISTER requests and maps IP addresses of devices to SIP uniform resource identifiers (URIs). A SIP URI typically has the form sip:username:password@host:port.

Telecommunications network 102 also includes a SIP proxy network entity 202 responsible for routing SIP messaging between other network entities and to/from user devices in telecommunications network 102. In practice, telecommunications network 102 will include many such SIP proxies. SIP messaging passing to/from any of user devices 110, 112, 114, 116 may be routed via SIP proxy 202 and one or more other SIP proxies.

SIP proxy 200 is depicted as being a separate entity to SIP registrar 106, but in practice may comprise a logical entity co-located within SIP registrar 106. SIP registrar network entity 106 includes a database for storing data associated with device registrations.

Figure 3:
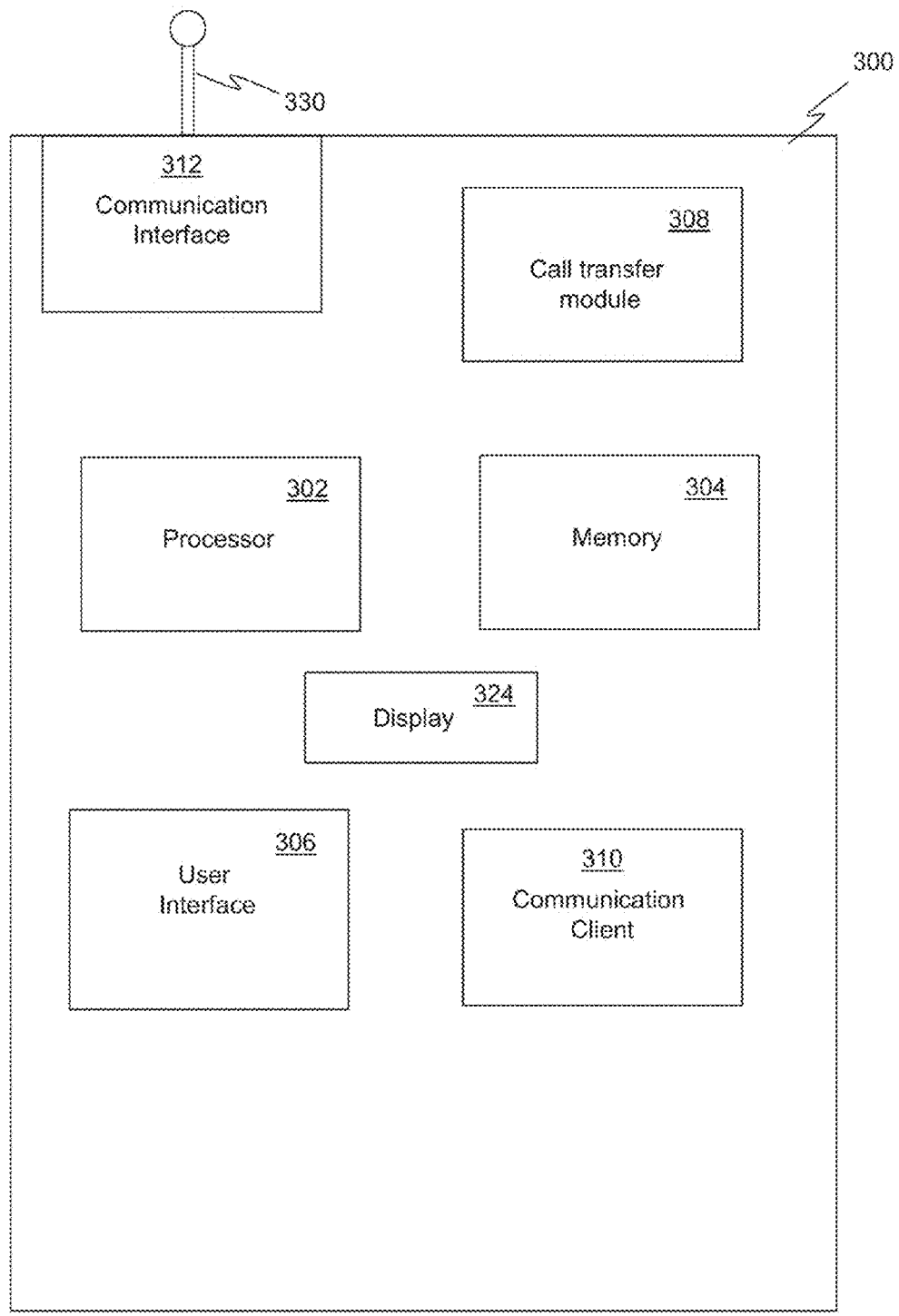
FIG. 3 shows a block diagram of a user device according to embodiments.

FIG. 3 shows a block diagram of a user device 300 according to embodiments. User device 300 is adapted for jumping of communication sessions such as voice and/or video calls in telecommunication network 102 according to embodiments. User device 300 may for example comprise mobile telephone 112 or tablet 114 depicted in FIG. 2.

User device 300 includes a processor 302 for carrying out data processing tasks of embodiments and other functionality of user device 300. User device 300 includes a memory 304 for storing data, including contact information and identifiers according to embodiments. User device 300 includes a user interface 306 for collecting user input from a user of the device, including user input associated with setting up and acceptance of communication sessions, such as telephone dialing number digits, and call jump operations.

In some embodiments, communication session jump is controlled by processor 302, in other embodiments, communication session jump is controlled by a dedicated call jump module 308, and in still other embodiments, communication session jump is controlled by a combination of processor 302 and call jump module 308.

In embodiments, user device 300 includes a display 324. In embodiments display 324 includes a touch-screen display, which, in conjunction with user interface 306, forms a graphical user interface. One or more touch-sensitive screen regions (or 'buttons') are configurable by processor 302 on the graphical user interface.

In embodiments, user device 300 includes a communication client 310 adapted to communicate with telecommunications network 102. User device 300 includes one or more antennae 330 connected to communication interface 312 for wireless radio communication. User device 300 may contain multiple different communication clients, antennae and communication interfaces.

In some embodiments, communication client 310 includes a cellular communication client adapted to communicate via a cellular part of telecommunications network 102 and/or a VoIP communication client adapted to communicate via a packet-switched part of telecommunications network 102. In embodiments, communication interface 312 includes a cellular radio modem and/or a non-cellular radio modem.

When a user device, for example mobile telephone 112 or tablet 114, registers with a SIP registrar network entity, such as SIP registrar 200, the user device includes both a display name and a +sip.instances parameter in its contact information. User devices subscribe for registration state for their address of record, so all such user devices with the same address of record get to see each other's contact information. The +sip.instances parameter ensures uniqueness and allows each user device to recognise its own contact information (even if the IP addresses in the registration have been changed by a session border controller (SBC) or by network address translation (NAT)), and the display name provides a name suitable for displaying in user interfaces. This mechanism allows each user device associated with a user to locate other active paired devices for the user in telecommunications network 102.

Figure 4:
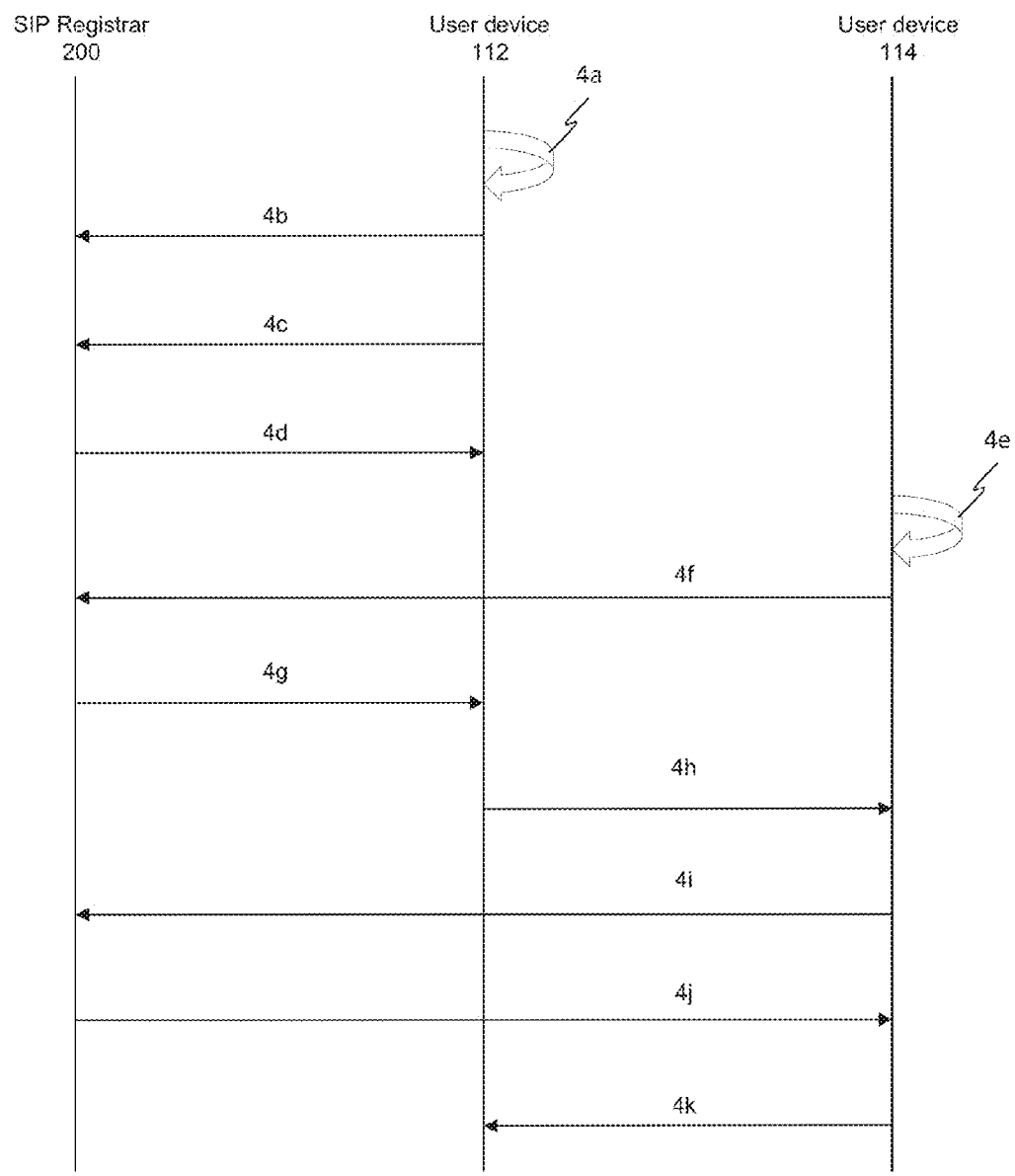
FIG. 4 shows a flow diagram according to embodiments.

FIG. 4 shows a flow diagram according to embodiments. FIG. 4 depicts message flows for two user devices 112, 114 associated with a user called Bob registering with a SIP registrar network entity 200 located in telecommunications network 102. In these example embodiments, user device 112 comprises a mobile telephone with SIP processing capabilities and user device 114 comprises a tablet with SIP processing capabilities. Some SIP responses and acknowledgements (ACKs) are omitted for brevity.

The process begins in step 4a when Bob turns on user device 112. User device 112 transmits a SIP REGISTER message containing contact information for user device 112 to SIP registrar 200 in step 4b. The contact information may for example include a SIP URI such as Bob@address1:port1, where address1 is the IP address assigned to user device 112 and port1 is the port that user device 112 is using for SIP communications. Upon receipt of the SIP REGISTER message of step 4b, SIP registrar entity 200 registers user device 112 as an active device associated with Bob which is contactable within telecommunications network 102 via the contact information provided for user device 112 in step 4b.

User device 112 transmits a subscription request, for example in the form of a SIP SUBSCRIBE (Event=reg) message to SIP registrar 200 in step 4c to be notified of registration of any other user devices associated with the user Bob in telecommunications network 102. User device 112 is thus notified of registration of user device 112 in step 4d in the form of a SIP NOTIFY (Event=reg, Bob@address1:port1) message which contains contact information (in this case a SIP URI of Bob@address1:port1) for user device 112.

Bob turns on user device 114 as shown by step 4e. User device 114 transmits a SIP REGISTER message containing contact information for user device 114 to SIP registrar 200 in step 4f. The contact information may for example include a SIP URI such as Bob@address2:port2, where address2 is the IP address assigned to user device 114 and port2 is the port that user device 114 is using for SIP communications. Upon receipt of the SIP REGISTER message of step 4f, SIP registrar entity 200 registers user device 114 as an active device associated with Bob which is contactable within telecommunications network 102 via the contact information provided for user device 114 in step 4f.

In response to the registration of user device 114, SIP registrar 200 notifies user device 112 of registration of user device 114 in step 4g in the form of a SIP NOTIFY (Event=reg, Bob@address1:port1+Bob@address2:port2) message which contains contact information (in this case a SIP URI of Bob@address2:port2) for user device 114 as well as contact information (in this case a SIP URI of Bob@address1:port1) for user device 112. User device 112 and user device 114 are now registered for user Bob in telecommunications network 102, such being referred to as 'paired devices'.

Using the contact information for user device 114 received in step 4g, user device 112 transmits a subscription request in the form of a SIP SUBSCRIBE (Event=dialog) message to user device 114 in step 4h to be notified of any communication sessions established on paired user device 114. This enables user device 112 to be notified of any SIP dialog state on user device 114, thus allowing user device 112 to keep track of active calls on paired device 114.

User device 114 transmits a subscription request in the form of a SIP SUBSCRIBE (Event=reg) message to SIP registrar 200 in step 4i to be notified of registration of any other user devices associated with the user Bob. User device 114 is thus notified of registration of user device 112 in step 4j in the form of a SIP NOTIFY (Event=reg, Bob@address1:port1+Bob@address2:port2) message which contains contact information (in this case a SIP URI of Bob@address1:port1) for user device 112 as well as contact information (in this case a SIP URI of Bob@address2:port2) for user device 114.

Using the contact information for user device 112 received in step 4j, user device 114 transmits a subscription request in the form of a SIP SUBSCRIBE (Event=dialog) message to user device 112 in step 4k to be notified of any communication sessions established on paired user device 112. This enables user device 114 to be notified of any SIP dialog state on user device 112, thus allowing user device 114 to keep track of active calls on paired device 112.

Due to the steps performed in FIG. 4, each of user device 112 and user device 114 are able to contact each other in telecommunication network 102 and will inform each other of any communication sessions established with any other devices in telecommunication network 102.

Figure 5:
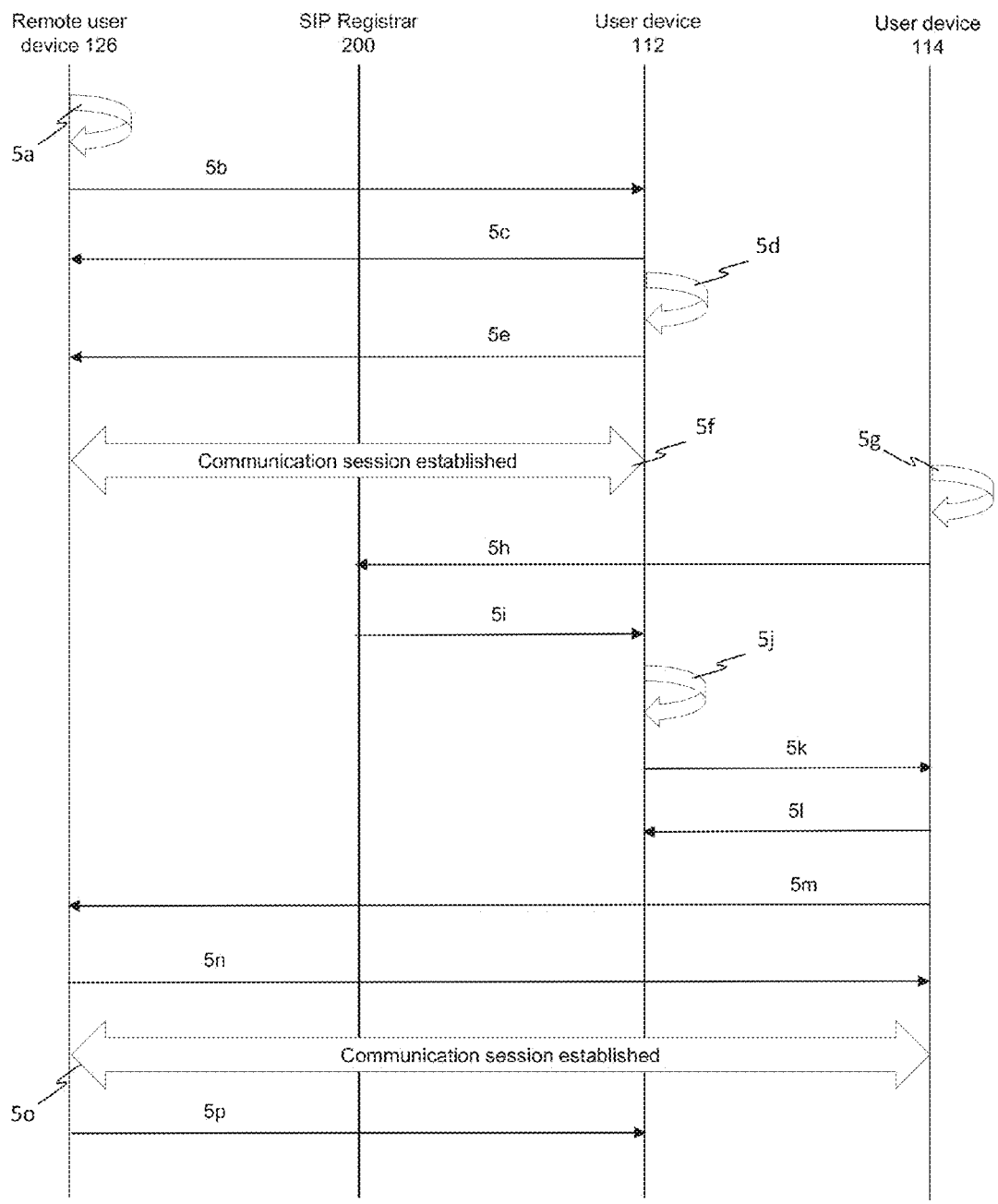
FIG. 5 shows a flow diagram according to embodiments.

FIG. 5 shows a flow diagram according to embodiments. FIG. 5 depicts message flows for a call push operation from a first user device 112 associated with a user called Bob to a second user device 114 which is also associated with Bob.

FIG. 5 involves moving an established communication session in a telecommunications network, the communication session being established between a first user 112 device in a plurality of user devices associated with a user Bob and a remote user device 126 associated with a remote party called Alice, to another device associated with user Bob. Some SIP responses and acknowledgements (ACKs) are omitted for brevity.

The process begins in step 5a when a user of remote user device 126 called Alice initiates a communication session with user device 112 associated with Bob in step 5a which results in a communication session setup request in the form of a SIP INVITE message being transmitted from remote user device 126 to user device 112 in step 5b. Upon receipt of the SIP INVITE message of step 5b, user device 112 activates one or more alert mechanisms on user device 112 to alert Bob as to the incoming communication session setup request, for example by activating a ringing, visual and/or vibrating alert function on user device 112. User device 112 informs remote user device 126 that it is waiting for Bob to react to the activated alert mechanism(s) by transmitting a SIP 180 Ringing message to remote user device 126 in step 5c.

Bob decides to accept the communication session setup request (or 'Bob accepts the call') by entering appropriate user input on a user interface of user device 112 in step 5d and user device 112 notifies remote user device 126 of such by transmitting a SIP 200 OK message to remote user device 126 in step 5e. A communication session between remote user device 126 and user device 112 thus ensues and Alice and Bob are able to communicate with each other using remote user device 126 and user device 112 respectively as shown by item 5*f*.

Bob answered the call on user device 112 which in this embodiment is a mobile telephone, but decides he wants to push the call to his user device 114 which is a tablet so that he can make use of the larger screen that user device 114 has, for example for conducting video communication. In this example user device 114 is turned off, so Bob therefore turns it on in step 5*g*.

User device 114 transmits a SIP REGISTER message containing contact information for user device 114 to SIP registrar 200 in step 5*h*. The contact information may for example include a SIP URI such as Bob@address2:port2. Upon receipt of the SIP REGISTER message of step 5*h*, SIP registrar entity 200 registers user device 114 as an active device associated with Bob which is contactable within telecommunications network 102 via the contact information for user device 114 provided in step 5*h*.

For these embodiments, it is assumed that, prior to step 5*i*, user device 112 transmits (not shown) a subscription request in the form of a SIP SUBSCRIBE (Event=reg) message to SIP registrar 200 to be notified of registration of any other user devices associated with the user Bob in a similar manner as per step 4*c* described above in relation to FIG. 4. This means that, in response to the registration of user device 114 in step 5*h*, SIP registrar 200 notifies user device 112 in step 5*i* of the registration of user device 114 by transmitting a registration notification to user device 112 in the form of a SIP NOTIFY (Event=reg, Bob@address2:port2+ Bob@address1:port1) message which contains contact information (in this case a SIP URI of Bob@address2:port2) for user device 114 as well as contact information (in this case a SIP URI of Bob@address1:port1) for user device 112 in a similar manner as per step 4*g* of FIG. 4 described above.

User device 112 associated with Bob is now aware that user device 114, also associated with Bob, is registered with telecommunications network 102 and is thus available for moving of the communication session established between remote user device 126 and user device 112, i.e. user device 114 is available for call push from user device 112.

User device 112 therefore configures a user interface on user device 112 to display a call push option. By entering appropriate user input on the user interface of user device 114, for example by pressing a button displayed on a touch-screen part of the user interface or invoking an associated menu item, Bob accepts the call push option, as shown by step 5*j*.

In response to the user input via the call push option displayed on user device 112 in step 5*j*, user device 112 transmits, to user device 114 using the contact information included in the registration notification of step 5*i*, a request to establish a communication session between user device 114 and remote party device 126 in place of the communication session established between user device 112 and remote party device 126 in step 5*k*. In embodiments, the request of step 5*k* includes contact information for remote user device 126 (for example a SIP URI of Alice@address3:port3).

In embodiments, the request of step 5*k* transmitted from user device 112 to user device 114 comprises a SIP REFER message and the contact information for remote user device 126 is included in a Refer-to header of the SIP REFER message.

In embodiments, the request transmitted from user device 112 to user device 114 in step 5*k* includes an identifier for the communication session established between user device 112 and remote user device 126, for example a SIP dialog identifier for the communication session established between user device 112 and remote user device 126.

In embodiments where the request of step 5*k* comprises a SIP REFER message, the identifier for the communication session established between user device 112 and remote user device 126 is included in a SIP Replaces parameter in the Refer-to header of the SIP REFER message of step 5*k*.

In embodiments, user device 114 transmits to user device 112 an acceptance indication indicating that the request to establish a communication session with remote user device 126 has been accepted in step 5*l*. In embodiments, the acceptance indication of step 5*l* comprises a SIP 202 Accepted message.

In step 5*m*, user device 114 transmits a request to remote user device 126 to replace the communication session established between user device 112 and remote user device 126 with a communication session between user device 114 and remote user device 126. The request of step 5*m* is transmitted to remote user device 126 using the contact information for remote user device 126 included in the request received in step 5*k*. In embodiments, the request of step 5*m* transmitted to remote party device 126 comprises a SIP INVITE (Replaces) message.

In embodiments, the request transmitted from user device 114 to remote user 126 in step 5*m* includes an identifier for the communication session established between user device 112 and remote user device 126, for example a SIP dialog identifier for the communication session established between user device 112 and remote user device 126. In embodiments where the request of step 5*m* transmitted to remote party device 126 comprises a SIP INVITE (Replaces) message, the identifier for the communication session is included in a SIP Replaces header in the SIP INVITE (Replaces) message.

Remote user device 126 accepts the request to replace the communication session established between user device 112 and remote user device 126 with a communication session between user device 114 and remote user device 126 and transmits an indication that the request to establish a communication session with remote user device 126 has been accepted to user device 114 in step 5*n*. In embodiments, the indication of step 5*n* transmitted from remote user device 126 to user device 114 comprises a SIP 200 OK message.

A communication session between remote user device 126 and user device 114 thus ensues and Alice and Bob are able to communicate with each other using remote user device 126 and user device 114 respectively as shown by item 5*o*.

The communication session established between user device 112 and remote user device 126 is then torn down in step 5*p*, although this may occur before step 5*n* or step 5*o* or substantially contemporaneously therewith. In embodiments, tearing down the communication session established between user device 112 and remote user device 126 is carried out in response to receipt of request of step 5*m* and/or transmittal of the indication of step 5*n* and includes remote user device 126 transmitting a SIP BYE message to user device 112 in step 5*p* which terminates the communication session established between user device 112 and remote user device 126.

Embodiments of FIG. 5 therefore enable replacement of a communication session established between user device 112 and remote user device 126 with a communication session established between user device 114 and remote user device 126, the replacement comprising a call push operation from user device 112 to user device 114.

In embodiments, the request to establish a communication session between user device 114 and remote party device 126 in place of the communication session established between user device 112 and remote party device 126 of step 5*k* is transmitted from user device 112 to user device 114 without passing via an application server entity (for example server 106 of FIG. 1) in telecommunications network 102.

In embodiments, the request to establish a communication session between user device 114 and remote party device 126 in place of the communication session established between user device 112 and remote party device 126 of step 5*m* is transmitted from user device 114 to remote user device 126 without passing via an application server entity (for example server 106 of FIG. 1) in telecommunications network 102.

Note that some embodiments of the present disclosure described above do not use an intermediate server, such as an application server, for use in providing call jump functionality. However, such embodiments can still be employed in cases where one or more intermediate servers are used for other purposes either while setting up an initial communication session or setting up a replacement communication session, for example in order to provide other services such as privacy or call barring services, or for network routing or network address translation (NAT) traversal purposes.

Embodiments therefore allow implementation of a call push operation directly between user devices (in this case between user device 112 and user device 114), without requiring a server to remain in the call signaling path for communication sessions conducted by either user device. Such 'peer-to-peer' communication session jump embodiments therefore do not suffer from cost and reliability downsides which server-based prior art call jump implementations can suffer from.

Some embodiments include, prior to receipt of the request from user device 112 to replace the communication session established between user device 112 and remote user device 126 with a communication session between user device 114 and remote user device 126, configuring user device 114 into an auto-accept mode in relation to requests from user device 112. This means that in such embodiments the request of step 5*m* is transmitted by user device 114 to remote user device 126 upon receipt of the request of step 5*k* from user device 112 at user device 114. Such embodiments allow call push to user device 114 from user device 112 to occur without further user input from Bob on user device 114.

Other embodiments include, in response to receipt of the request of step 5*k* from user device 112 at user device 114, configuring a user interface on user device 114 to display a call push accept option. In such embodiments, the request of 5*m* is transmitted to remote user device 126 by user device 114 in response to user input (not shown in FIG. 5) via the call push accept option displayed on user device 114. Such embodiments require further user input from Bob on user device 114 in order to allow call push to user device 114 from user device 112.

Figure 6:
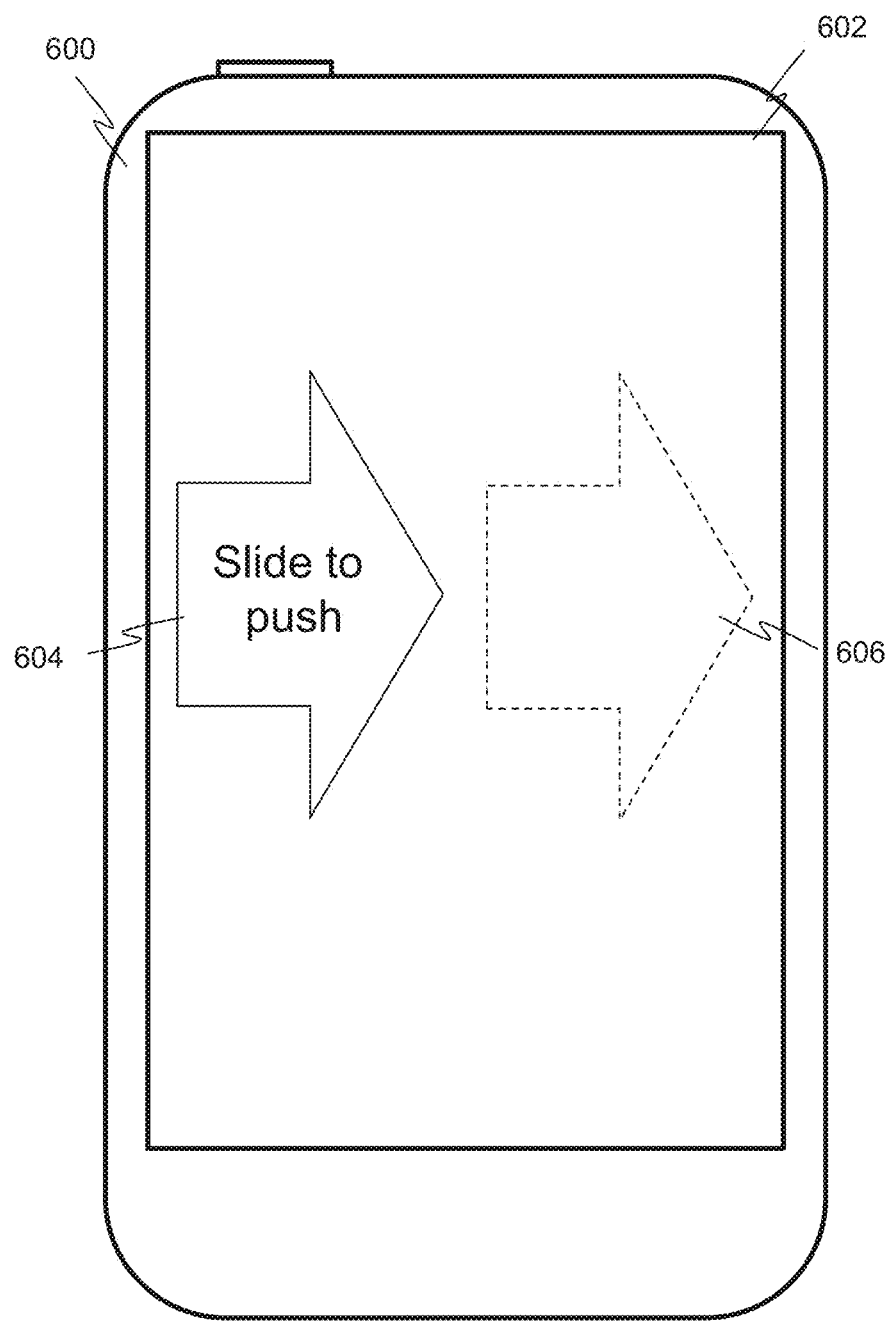
FIG. 6 shows a diagram of a user device according to embodiments.

FIG. 6 shows a diagram of a user device according to embodiments. The user device 600 depicted in FIG. 6 may for example comprise user device 112 described above in relation to FIG. 5.

In response to receipt of a registration notification from SIP registrar 200, such as the registration notification of step 5*i* described above in relation to FIG. 5, user device 600 configures a user interface on user device 600 to display a call push option. In this example embodiment, the user interface includes a touch-screen user interface 602 and the call push option comprises a touch-sensitive region (or 'button') 604 configured within touch-screen user interface 602.

Button 604 includes the text 'slide to push' embedded within the button indicating to the user that selecting this button will allow them to push (or 'jump') the established communication session from user device 600 to another paired user device. In this embodiment, the arrow form of the button which points to the right indicates to the user that they should touch the button located in position 604 and slide the button to the right to position 606 in order to initiate a push of the communication session from user device 600 to another paired device such as user device 114 described above in relation to FIG. 5.

In embodiments, a request to replace a communication session established between user device 600 and a remote user device (such as remote user device 126 described above in relation to FIG. 5) with a communication session between another paired user device (such as user device 114 described above in relation to FIG. 5) and the remote user device is transmitted to the other paired device in response to appropriate user input via the call push option 604 displayed on user device 600. In this case, the appropriate user input includes pressing button 604 and sliding it to position 606.

Figure 7:
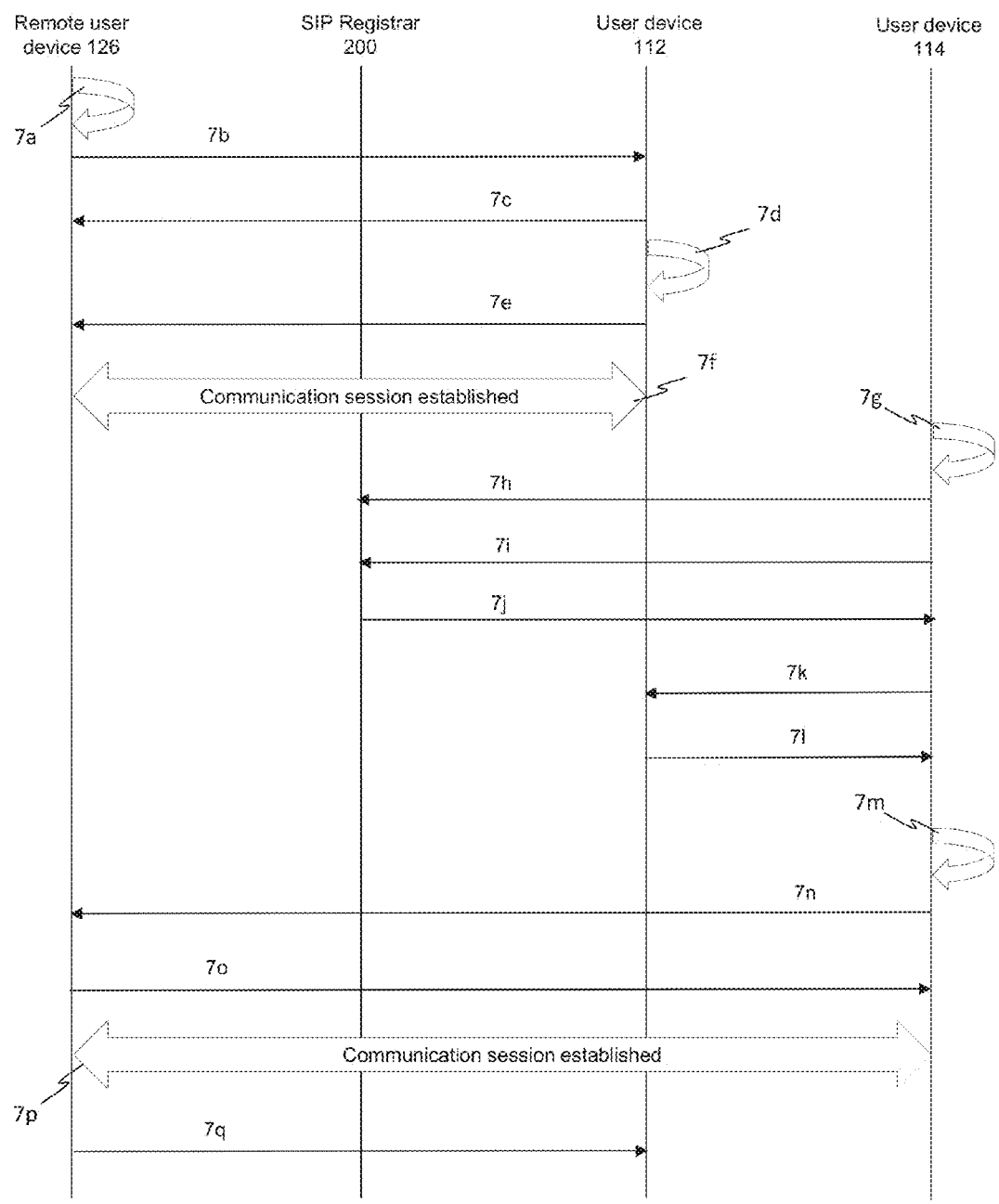
FIG. 7 shows a flow diagram according to embodiments.

FIG. 7 shows a flow diagram according to embodiments. FIG. 7 depicts message flows for a call pull operation from a first user device 112 associated with a user called Bob to a second user device 114 which is also associated with Bob.

FIG. 7 involves moving an established communication session in a telecommunications network, the communication session being established between a first user 112 device in a plurality of user devices associated with a user Bob and a remote user device 126 associated with a remote party called Alice, to another user device associated with user Bob. Some SIP responses and acknowledgements (ACKs) are omitted for brevity.

A communication session between remote user device 126 and user device 112 is established in steps 7*a* to 7*f* in a similar manner as to steps 5*a* to 5*f* described above in relation to FIG. 5; Alice and Bob are thus able to communicate with each other using remote user device 126 and user device 112 respectively as shown by item 7*f*.

Bob answered the call on user device 112 which in this embodiment is a mobile telephone, but decides he wants to pull the call to his user device 114 which is a tablet. Bob therefore turns on user device 114 in step 7*g*.

User device 114 transmits a SIP REGISTER message containing contact information for user device 114 to SIP registrar 200 in step 7*h*. The contact information may for example include a SIP URI such as Bob@address2:port2. Upon receipt of the SIP REGISTER message of step 7*h*, SIP registrar entity 200 registers user device 114 as an active device associated with Bob which is contactable within telecommunications network 102 via the contact information for user device 114 provided in step 7*h*.

In step 7*i*, user device 114 transmits a subscription request to SIP registrar 200 to be notified of registration with telecommunications network 102 of user devices in a plurality of user devices associated with user Bob. In embodiments, the subscription request transmitted to SIP registrar entity 200 by user device 114 in step 7*i* comprises a SIP SUBSCRIBE (Event=reg) message.

For these embodiments, it is assumed that, prior to step 7*i*, user device 112 transmits (not shown in FIG. 7) a SIP REGISTER message containing contact information for user device 112 to SIP registrar 200. The contact information may for example include a SIP URI such as Bob@address1:port1. Upon receipt of the SIP REGISTER message from user device 112, SIP registrar entity 200 registers user device 112 as an active device associated with Bob which is contactable within telecommunications network 102 via the contact information provided by user device 112. This means that, in response to the subscription of user device 114 with SIP registrar 200 in step 7*i*, a registration notification that user device 112 has registered with telecommunications network 102 is transmitted from SIP registrar 200 to user device 114 in step 7j. The registration notification of step 7j from SIP registrar 200 includes contact information for user device 112. In embodiments, the registration notification of step 7j comprises a SIP NOTIFY (Event=reg, Bob@address1:port1+ Bob@address2:port2) message which contains contact information (in this case a SIP URI of Bob@address1:port1) for user device 112 as well as contact information (in this case a SIP URI of Bob@address2:port2) for user device 114.

User device 114 associated with Bob is now aware that user device 112, also associated with Bob, is registered with telecommunications network 102. User device 114 therefore transmits a subscription request to user device 112 in step 7k in order to be notified of any communication sessions established with user device 112. In embodiments, the subscription request transmitted to user device 112 from user device 114 in step 7k is transmitted using the contact information for user device 112 received from the SIP registrar 200 in step 7j. In embodiments, the subscription request transmitted from user device 114 to user device 112 in step 7k comprises a SIP SUBSCRIBE (Event=dialog) message.

In response to the subscription of user device 114 with user device 112 in step 7k, user device 112 transmits a notification that a communication session has been established between user device 112 and remote user device 126 to user device 114 in step 7l. The communication session establishment notification of step 7l includes contact information for remote user device 126. In embodiments, the communication session establishment notification of step 7l comprises a SIP NOTIFY (Event=dialog) message.

In embodiments, the communication session establishment notification of step 7l further includes an identifier for the communication session established between user device 112 and remote user device 126.

In embodiments, the identifier for the communication session established between user device 112 and remote user device 126 comprises a SIP dialog identifier for the communication session established between user device 112 and remote user device 126.

User device 114 associated with Bob is now aware that a communication session is being conducted between user device 112, also associated with Bob, and remote user device 126 and that the established communication session is thus available for pulling to user device 114.

User device 114 therefore configures a user interface on user device 114 to display a call pull option. By entering appropriate user input on the user interface of user device 114, for example by pressing a button displayed on a touch-screen part of the user interface or invoking an associated menu item, Bob accepts the call pull option, as shown by step 7m.

In response to the user input received via the call pull option displayed on the user interface of user device 114 in step 7m, user device 114 transmits, to remote user device 126 using the contact information for remote user device 126 included in the communication session establishment notification of step 7l, a request to replace the communication session established between user device 112 and remote party device 126 with a communication session between user device 114 and remote party device 126 in step 7n. In embodiments, the request of step 7n includes the contact information for remote user device 126 received by user device 114 in step 7l.

In embodiments, the request transmitted to remote party device 126 in step 7n comprises a SIP INVITE (Replaces) message. In embodiments, the identifier for the communication session is included in a SIP Replaces header in the SIP INVITE (Replaces) message of step 7n and comprises a SIP dialog identifier for the communication session established between user device 112 and remote user device 126.

In step 7o, remote user device 126 transmits an indication that the request from user device 114 to establish a communication session with remote user device 126 has been accepted. In embodiments, the acceptance indication transmitted from remote user device 126 to user device 114 in step 7o comprises a SIP 200 OK message.

A communication session between remote user device 126 and user device 114 thus ensues and Alice and Bob are able to communicate with each other using remote user device 126 and user device 114 respectively as shown by item 7p.

The communication session established between user device 112 and remote user device 126 is then torn down in step 7q, although this may occur before step 7o or step 7p or substantially contemporaneously therewith.

In embodiments, tearing down the communication session established between user device 112 and remote user device 126 is carried out in response to receipt of the request of step 7n and/or transmittal of the indication of step 7o and includes remote user device 126 transmitting a SIP BYE message to user device 112 in step 7q which terminates the communication session established between user device 112 and remote user device 126.

Embodiments of FIG. 7 therefore enable replacement of a communication session established between user device 112 and remote user device 126 with a communication session established between user device 114 and remote user device 126, the replacement comprising a call pull operation from user device 112 to user device 114.

In embodiments, the request of step 7n to replace a communication session established between user device 112 and remote party device 126 with a communication session between user device 114 and remote party device 126 is transmitted from user device 114 to remote user device 126 without passing via an application server entity (for example server 106 of FIG. 1) in telecommunications network 102.

In embodiments, the subscription request of step 7k to be notified of any communication sessions established with user device 112 is transmitted from user device 114 to user device 112 without passing via an application server entity (for example server 106 of FIG. 1) in telecommunications network 102.

In embodiments, the notification of a communication session established between user device 112 and remote user device 126 is transmitted from user device 112 to user device 114 without passing via an application server entity in telecommunications network 102.

Again, whilst embodiments of the present disclosure described above do not use an intermediate server, such as an application server, for use in providing call jump functionality, such embodiments could still be employed in cases where one or more intermediate servers are used for other purposes either while setting up an initial communication session or setting up a replacement communication session.

Embodiments therefore allow implementation of a call pull operation directly between user devices (in this case from user device 112 to user device 114), without requiring a server to remain in the call signaling path for communication sessions conducted by either user device. Such 'peer-to-peer' communication session jump embodiments therefore do not suffer from cost and reliability downsides which server-based prior art call jump implementations can suffer from.

Some embodiments include, prior to receipt by user device 112 of the subscription request of step 7k from user device 114, configuring user device 112 into an auto-accept mode in relation to subscription requests from user device 114. This means that in such embodiments, the communication session establishment notification of step 7*l* is transmitted to user device 114 upon receipt of the subscription request of step 7*k* from user device 114. Such embodiments allow call pull to user device 114 from user device 112 to occur without user input from Bob on user device 112.

Other embodiments include, in response to receipt of the subscription request from user device 114 in step 7*k*, configuring a user interface on user device 112 to display a call pull accept option. In such embodiments, the communication session establishment notification of step 7*l* is transmitted to user device 114 in response to user input (not shown in FIG. 7) via the call pull option displayed on user device 112 which indicated that the user gives permission for the proposed call pull to take place. Such embodiments require user input from Bob on user device 112 in order to allow call pull to user device 114 from user device 112.

Figure 8:
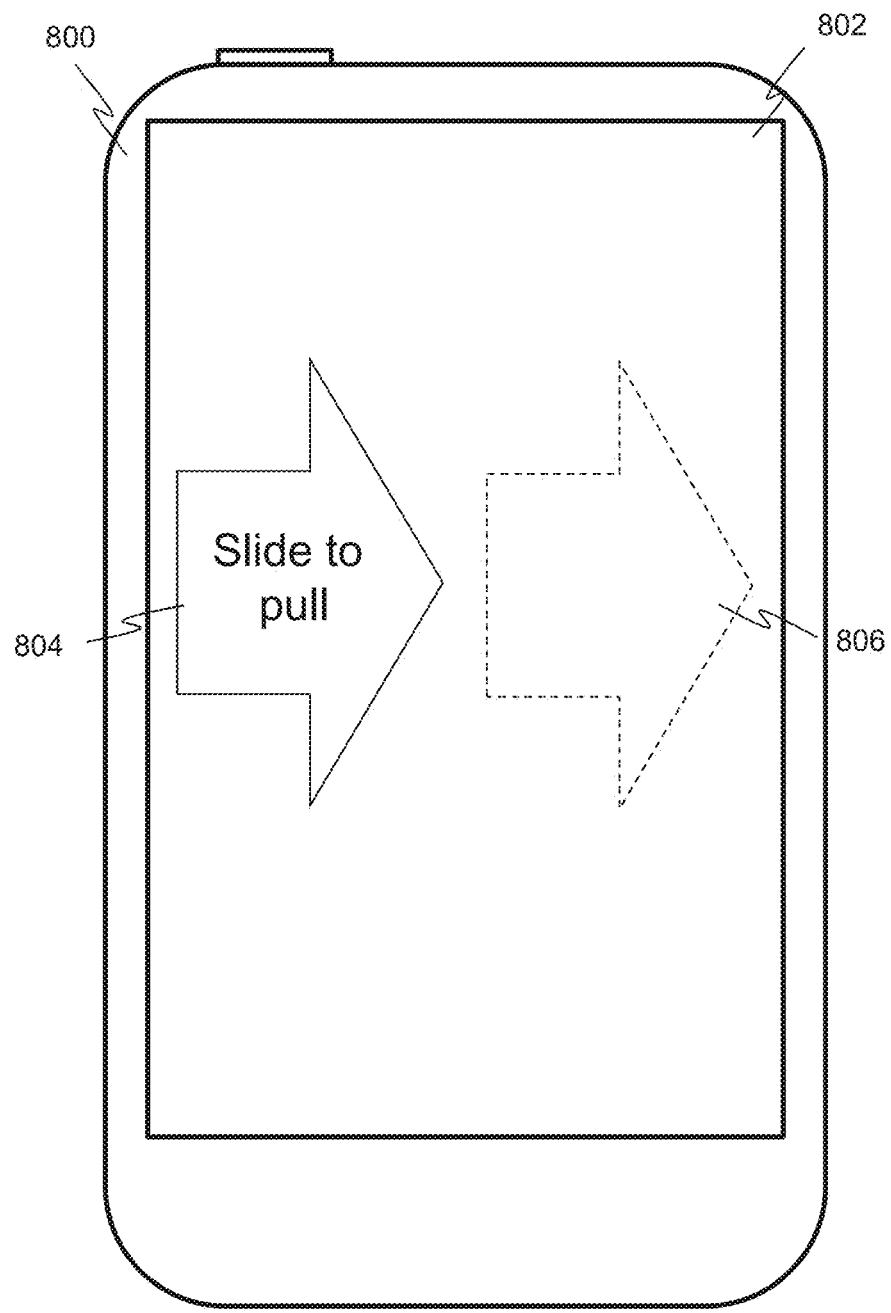
FIG. 8 shows a diagram of a user device according to embodiments.

FIG. 8 shows a diagram of a user device according to embodiments. The user device 800 depicted in FIG. 8 may for example comprise user device 114 described above in relation to FIG. 7.

In response to receipt at user device 800 of a communication session establishment notification from a user device paired to user device 800, such as the communication session establishment notification of step 7*l* described above in relation to FIG. 7, user device 800 configures a user interface on user device 800 to display a call pull option. In this example embodiment, the user interface includes a touch-screen user interface 802 and the call pull option comprises a touch-sensitive region (or 'button') 804 configured within touch-screen user interface 802.

Button 804 includes the text 'slide to pull' embedded within the button indicating to the user that selecting this button will allow them to pull (or 'jump') the established communication session to user device 800 from another paired user device. In this embodiment, the arrow form of the button which points to the right indicates to the user that they should touch the button located in position 804 and slide the button to the right to position 806 in order to initiate a pull of the communication session to user device 800 from another paired device such as user device 112 described above in relation to FIG. 7.

In embodiments, a request to establish a communication session between user device 800 and a remote user device (such as remote user device 126 described above in relation to FIG. 7) in place of a communication session between another paired user device (such as user device 112 described above in relation to FIG. 7) and the remote user device is transmitted to the other paired device in response to appropriate user input via the call push option 804 displayed on user device 800. In this case, the appropriate user input includes pressing button 804 and sliding it to position 806.

Figure 9:
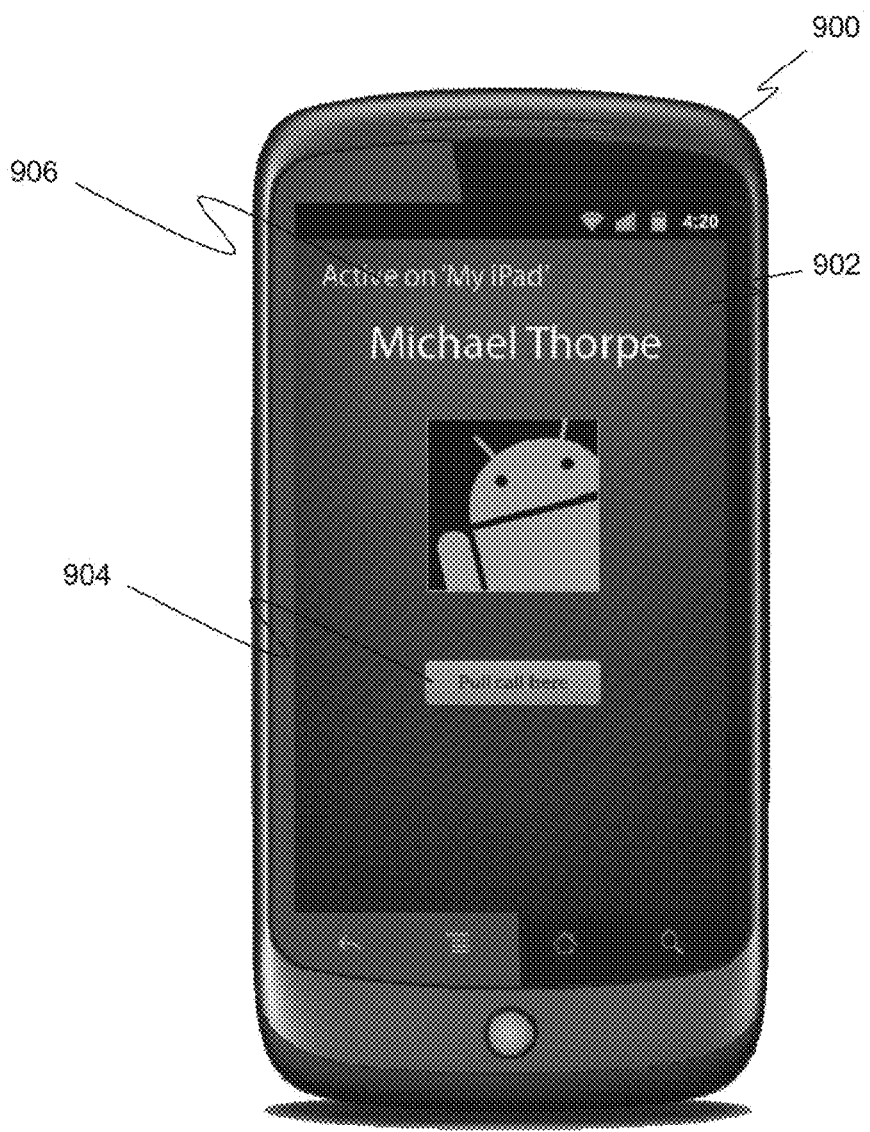
FIG. 9 shows a screen-shot of a user device according to embodiments.

FIG. 9 shows a screen-shot of a user device according to embodiments. The user device 900 depicted in FIG. 9 may for example comprise user device 114 described above in relation to FIG. 7. In response to receipt at user device 900 of a communication session establishment notification from a user device paired to user device 900, such as the communication session establishment notification of step 7*l* described above in relation to FIG. 7, user device 900 configures a user interface on user device 900 to display a call pull option. In this example embodiment, the user interface includes a touch-screen user interface 902 and the call pull option comprises a touch-sensitive region (or 'button') 904 configured within touch-screen user interface 902. Here the user is informed, as per item 906, that there is an active call with a third party (in this example somebody called 'Michael Thorpe') on a remote party user device (which is an ipad™ in this example) and a 'pull call here' button 904 is displayed to the user.

In embodiments, a request to establish a communication session between user device 900 and a remote user device (such as remote user device 126 described above in relation to FIG. 7) in place of a communication session between another paired user device (such as user device 112 described above in relation to FIG. 7) and the remote user device is transmitted to the other paired device in response to appropriate user input via the call push option 904 displayed on user device 900. In this case, the appropriate user input includes pressing button 904.

Embodiments include a method of moving an established communication session in a telecommunications network, the communication session being established between a first device in a plurality of user devices associated with a user and a remote user device associated with a remote party, to a second device in the plurality of user devices associated with the user, the method including, at the first user device:

receiving a message indicating that the second user device is registered with the network, the message including contact information for the second user device; and transmitting, to the second user device using the contact information included in the message, a request to establish a communication session between the second user device and the remote party device in place of the communication session established between the first user device and the remote party device, the request including contact information for the remote user device.

Embodiments include receiving, from the second user device, an acceptance indication indicating that the request to establish a communication session with the remote user device has been accepted.

In embodiments, the request further includes an identifier for the communication session established between the first user device and the remote user device.

In embodiments, the request is transmitted from the first user device to the second user device without passing via an application server entity in the network.

In embodiments, the message indicating that the second user device is registered with the network is a registration notification generated by a SIP registrar network entity in response to the second user device registering with the SIP registrar network entity.

In embodiments, the registration notification comprises a SIP NOTIFY (Event=reg) message or a SIP INFO message.

In embodiments, the request comprises a SIP REFER message and the contact information for the remote user device is included in a Refer-to header of the SIP REFER message.

In embodiments, the identifier for the communication session is included in a SIP Replaces parameter in the Refer-to header of the SIP REFER message and comprises a SIP dialog identifier for the communication session established between the first user device and the remote user device.

In embodiments, the acceptance indication comprises a SIP 202 Accepted message.

Embodiments include, in response to receipt of the message indicating that the second user device is registered with the network, configuring a user interface on the first device to display a call push option; in such embodiments, the request is transmitted to the second user device in response to user input via the call push option displayed on the first user device.

Embodiments include, in response to receipt of the acceptance indication, tearing down the communication session established between the first user device and the remote user device.

In embodiments, the moving comprises a call push operation from the first user device to the second user device.

Embodiments include apparatus for use in moving an established communication session in a telecommunications network, the communication session being established between a first device in a plurality of user devices associated with a user and a remote user device associated with a remote party, to a second device in the plurality of user devices associated with the user, the apparatus comprising at least one processor, and at least one memory including computer program code, the at least one memory and the computer program code being configured to, with the at least one processor, cause the apparatus at least to, at the first user device:

receive a message indicating that the second user device is registered with the network, the message including contact information for the second user device; and transmit, to the second user device using the contact information included in the message, a request to establish a communication session between the second user device and the remote party device in place of the communication session established between the first user device and the remote party device, the request including contact information for the remote user device.

Embodiments include a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second device in the plurality of user devices associated with the user, the method including, at the first user device:

receiving a message indicating that the second user device is registered with the network, the message including contact information for the second user device; and transmitting, to the second user device using the contact information included in the message, a request to establish a communication session between the second user device and the remote party device in place of the communication session established between the first user device and the remote party device, the request including contact information for the remote user device.

Embodiments include a method of moving an established communication session in a telecommunications network, the communication session being established between a first device in a plurality of user devices associated with a user and a remote user device associated with a remote party, to a second device in the plurality of user devices associated with the user, the method including, at the second user device:

receiving, from the first user device, a request to establish a communication session between the second user device and the remote user device in place of the communication session established between the first user device and the remote user device, the request including contact information for the remote user device; and transmitting to the remote user device using the contact information included in the communication session establishment notification, a request to replace the communication session established between the first user device and the remote user device with a communication session established between the second user device and the remote user device.

Embodiments include, in response to receipt of the request from the first device, transmitting, to the first user device, an indication that the request to establish a communication session with the remote user device has been accepted.

Embodiments include, prior to receipt of the request from the first user device, transmitting a registration request for the second user device to a SIP registrar entity in the network, the registration request including contact information for the second user device.

In embodiments, the request received from the first user device further includes an identifier for the communication session established between the first user device and the remote user device, and the request transmitted to the remote user device includes the identifier.

In embodiments, the request is received from the first user device without passing via an application server entity in the network.

In embodiments, the request received from the first user device comprises a SIP REFER message and the contact information for the remote user device is included in a Refer-to header of the SIP REFER message.

In embodiments, the identifier for the communication session is included in a SIP Replaces parameter in the Refer-to header of the SIP REFER message and comprises a SIP dialog identifier for the communication session established between the first user device and the remote user device.

In embodiments, the acceptance indication comprises a SIP 202 Accepted message.

In embodiments, the request transmitted to the remote user device comprises a SIP INVITE (Replaces) message.

In embodiments, the identifier for the communication session is included in a SIP Replaces header in the SIP INVITE (Replaces) message and comprises a SIP dialog identifier for the communication session established between the first user device and the remote user device.

Embodiments include configuring the second user device into an auto-accept mode in relation to requests from the first user device, whereby the request is transmitted to the remote user device upon receipt of the request from the first user device.

Embodiments include, in response to receipt of the request from the first user device, configuring a user interface on the second user device to display a call push accept option, wherein the request is transmitted to the remote user device in response to user input via the call push accept option displayed on the second user device.

In embodiments, the moving comprises a call push operation from the first user device to the second user device.

Embodiments include apparatus for use in moving an established communication session in a telecommunications network, the communication session being established between a first device in a plurality of user devices associated with a user and a remote user device associated with a remote party, to a second device in the plurality of user devices associated with the user, the apparatus comprising at least one processor, and at least one memory including computer program code, the at least one memory and the computer program code being configured to, with the at least one processor, cause the apparatus at least to, at the second user device:

receive, from the first user device, a request to establish a communication session between the second user device and the remote user device in place of the communication session established between the first user device and the remote user device, the request including contact information for the remote user device; and transmit to the remote user device using the contact information included in the communication session establishment notification, a request to replace the communication session established between the first user device and the remote user device with a communication session established between the second user device and the remote user device.

Embodiments include a computer program product comprising a non-transitory computer-readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second device in the plurality of user devices associated with the user, the method including, at the second user device:

receiving, from the first user device, a request to establish a communication session between the second user device and the remote user device in place of the communication session established between the first user device and the remote user device, the request including contact information for the remote user device; and transmitting to the remote user device using the contact information included in the communication session establishment notification, a request to replace the communication session established between the first user device and the remote user device with a communication session established between the second user device and the remote user device.

The above embodiments are to be understood as illustrative examples. Further embodiments are envisaged.

Embodiments are primarily described above in relation to SIP-compliant user devices and networks. However, embodiments can equally apply to non-SIP environments, for example involving other H.323, Media Gateway Control Protocol (MGCP), etc.

Embodiments are primarily described above where the user devices use SIP SUBSCRIBE and NOTIFY messages to find out about other user devices registered with the network and communication sessions established by those user devices. However, other embodiments are possible where the same information is conveyed in other types of SIP messages, for example SIP INFO messages could be used instead of or in combination with SIP SUBSCRIBE and NOTIFY messaging. Further, providing such functionality need not be limited to use of SIP, and one or more different protocols could be employed for such functionality, for example one or more out-of-band protocols.

Furthermore, in some implementations, user devices may need to register with the network and/or each other periodically or after occurrence of certain events. In such implementations, when a user device (re-)registers it may receive a list of other user devices in response, thus providing a framework by which knowledge of other user devices can be obtained without the need for use of SIP SUBSCRIBE and NOTIFY messaging.

Embodiments involving call push and call pull can be combined, for example allowing a call push option to be offered on one user device of a user and a call pull option to be offered on another user device of the user; the user can thus choose to move a communication session between user devices either via a call push or a call pull operation.

Embodiments described above involve communication session jump between two paired user devices for explanatory purposes. However, embodiments can also apply to situations involving communication session jump between three or more paired devices. For example, a user can be given multiple call push options corresponding to different user devices to which a communication session can be pushed. As another example, a user may be able to pull a communication session established on one user device to a choice of multiple active other user devices.

Any or all functions of processor 302 and/or call jump module 308 may be carried out by computer software and/or firmware, communication session jump application software and/or the operating system of a user device.

In embodiments involving SIP, where a user device does not support the required flows (for example one or more of the SIP messaging primitives in embodiments described above), a SIP proxy server can be left in the call path to convert between the peer-to-peer call jump flows and simpler flows supported by all user devices. Such a mode of operation requires a server in the signalling path for the duration of the call, but can support both push and pull operations and the proxy device is significantly simpler and more efficient than a device required to support both SIP and out-of-band signaling.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of embodiments, which is defined in the accompanying claims.

The invention claimed is:

1. A method of moving an established communication session in a telecommunications network, the communication session being established between a first device in a plurality of user devices associated with a user and a remote user device associated with a remote party, to a second device in the plurality of user devices associated with the user, the method comprising:
   at the second user device, transmitting a request to a SIP registrar entity in the network to be notified of registration of user devices in the plurality with the network;
   at the second user device, in response to the transmittal of the request to the SIP registrar entity, receiving a message from the SIP registrar entity indicating that the first user device has registered with the network, the message received from the SIP registrar entity comprising contact information for the first user device;
   at the second user device, transmitting a request to the first user device to be notified of any communication sessions established with the first user device, wherein the request transmitted to the first user device is transmitted using the contact information for the first user device received from the SIP registrar entity;
   at the second user device, receiving, from the first user device, a message indicating that a communication session has been established between the first user device and the remote user device, the message comprising contact information for the remote user device, wherein the message indicating that a communication session has been established between the first user device and the remote user device is received in response to the transmittal of the request to the first user device;
   at the second user device, in response to receipt of the message indicating that a communication session has been established between the first user device and the remote user device, configuring a user interface on the second user device to display a call pull option;

at the second user device, receiving user input via the call pull option displayed on the second user device; and at the second user device, in response to the user input via the call pull option displayed on the second user device, transmitting, to the remote user device using the contact information comprised in the message, a request to replace the communication session established between the first user device and the remote user device with a communication session between the second user device and the remote user device.

2. A method according to claim 1, wherein the message further comprises an identifier for the communication session established between the first user device and the remote user device, and wherein the request transmitted to the remote user device comprises the identifier.

3. A method according to claim 1, wherein the request transmitted to the first user device comprises a SIP SUBSCRIBE (Event=dialog) message or a SIP INFO message.

4. A method according to claim 1, wherein the request transmitted to the SIP registrar entity comprises a SIP SUBSCRIBE (Event=reg) message or a SIP INFO message.

5. A method according to claim 1, comprising, prior to transmittal of the request to be notified of registration of user devices to the SIP registrar entity, transmitting a registration request for the second user device to a SIP registrar entity in the network, the registration request comprising contact information for the second user device.

6. A method according to claim 1, wherein the request transmitted to the first user device is transmitted to the first user device without passing via an application server entity in the network.

7. A method according to claim 1, wherein the request transmitted to the remote party device comprises a SIP INVITE (Replaces) message.

8. A method according to claim 2, wherein the identifier for the communication session is comprised in a SIP Replaces header in the SIP INVITE (Replaces) message and comprises a SIP dialog identifier for the communication session established between the first user device and the remote user device.

9. A method according to claim 1, wherein the message indicating that the first user device has registered with the network comprises a SIP NOTIFY (Event=reg) message or a SIP INFO message.

10. A method according to claim 1, wherein the message indicating that a communication session has been established comprises a SIP NOTIFY (Event=dialog) message or a SIP INFO message.

11. A method according to claim 1, comprising receiving, from the remote user device, an indication that the request to establish a communication session with the remote user device has been accepted.

12. A method according to claim 11, wherein the acceptance indication received from the remote user device comprises a SIP 200 OK message.

13. A method according to claim 1, wherein the moving comprises a call pull operation from the first user device to the second user device.

14. Apparatus for use in moving an established communication session in a telecommunications network, the communication session being established between a first device in a plurality of user devices associated with a user and a remote user device associated with a remote party, to a second device in the plurality of user devices associated with the user, the apparatus comprising at least one processor, and at least one memory including computer program code, the at least one memory and the computer program code being configured to, with the at least one processor, cause the apparatus at least to:

at the second user device, transmitting a request to a SIP registrar entity in the network to be notified of registration of user devices in the plurality with the network;

at the second user device, in response to the transmittal of the request to the SIP registrar entity, receiving a message from the SIP registrar entity indicating that the first user device has registered with the network, the message received from the SIP registrar entity comprising contact information for the first user device;

at the second user device, transmitting a request to the first user device to be notified of any communication sessions established with the first user device, wherein the request transmitted to the first user device is transmitted using the contact information for the first user device received from the SIP registrar entity;

at the second user device, receive, from the first user device, a message indicating that a communication session has been established between the first user device and the remote user device, the message comprising contact information for the remote user device, wherein the message indicating that a communication session has been established between the first user device and the remote user device is received in response to the transmittal of the request to the first user device;

at the second user device, in response to receipt of the message indicating that a communication session has been established between the first user device and the remote user device, configure a user interface on the second user device to display a call pull option;

at the second user device, receive user input via the call pull option displayed on the second user device; and at the second user device, in response to the user input via the call pull option displayed on the second user device, transmit, to the remote user device using the contact information comprised in the message, a request to replace the communication session established between the first user device and the remote user device with a communication session between the second user device and the remote user device.

15. A computer program product comprising a non-transitory computer readable storage medium having computer readable instructions stored thereon, the computer readable instructions being executable by a computerized device to cause the computerized device to perform a method for moving an established communication session in a telecommunications network, the communication session being established between a first device in a plurality of user devices associated with a user and a remote user device associated with a remote party, to a second device in the plurality of user devices associated with the user, the method comprising:

at the second user device, transmitting a request to a SIP registrar entity in the network to be notified of registration of user devices in the plurality with the network;

at the second user device, in response to the transmittal of the request to the SIP registrar entity, receiving a message from the SIP registrar entity indicating that the first user device has registered with the network, the message received from the SIP registrar entity comprising contact information for the first user device;

at the second user device, transmitting a request to the first user device to be notified of any communication sessions established with the first user device, wherein the request transmitted to the first user device is transmitted using the contact information for the first user device received from the SIP registrar entity;

at the second user device, receiving, from the first user device, a message indicating that a communication session has been established between the first user device and the remote user device, the message comprising contact information for the remote user device, wherein the message indicating that a communication session has been established between the first user device and the remote user device is received in response to the transmittal of the request to the first user device;

at the second user device, in response to receipt of the message indicating that a communication session has been established between the first user device and the remote user device, configuring a user interface on the second user device to display a call pull option;

at the second user device, receiving user input via the call pull option displayed on the second user device; and at the second user device, in response to the user input via the call pull option displayed on the second user device, transmitting, to the remote user device using the contact information comprised in the message, a request to replace the communication session established between the first user device and the remote user device with a communication session between the second user device and the remote user device.

* * * * *